United States Patent [19]

Horie

[11] 3,729,819

[45] May 1, 1973

[54] METHOD AND DEVICE FOR FABRICATING PRINTED WIRING OR THE LIKE

[75] Inventor: Isao Horie, Chigusa-ku, Nagoya-shi, Japan

[73] Assignee: Nippon Toki Kabushiki Kaisha, Nagoya-shi, Aichi-ken, Japan

[22] Filed: Jan. 9, 1970

[21] Appl. No.: 1,816

[52] U.S. Cl. ......................29/625, 156/52, 161/406, 161/413, 174/68.5

[51] Int. Cl. ..........................B41m 3/08, H05k 3/20

[58] Field of Search ........................29/625; 156/277, 156/89, 52, 179; 161/406, 413, DIG. 7

[56] References Cited

UNITED STATES PATENTS

| | | | |
|---|---|---|---|
| 2,629,670 | 2/1953 | Rathke | 161/406 T X |
| 2,711,983 | 6/1955 | Hoyt | 161/DIG. 7 |
| 2,969,300 | 1/1961 | Franz | 161/DIG. 7 |
| 3,007,829 | 11/1961 | Akkeron | 161/406 T X |
| 3,270,122 | 8/1966 | Binek | 156/52 X |
| 3,471,357 | 10/1969 | Bildusas | 161/406 X |
| 3,574,029 | 4/1971 | Ettre | 161/406 X |
| 3,134,953 | 5/1964 | Eisler | 29/625 UX |
| 3,215,574 | 11/1965 | Korb | 29/625 UX |
| 3,279,969 | 10/1966 | Borchardt | 29/625 X |
| 3,380,854 | 4/1968 | Robinson | 156/89 |

*Primary Examiner*—Richard J. Herbst
*Assistant Examiner*—Joseph A. Walkowski
*Attorney*—Flynn & Frishauf

[57] ABSTRACT

A transfer device comprises a base layer of paper or the like, an adhesive layer attached to said base layer directly or by means of a thin paper, a conductive pattern or circuit element pattern printed on said adhesive layer and, further, a carrier layer over said pattern. Printed wiring, integrated circuits or the like are fabricated by printing a circuit pattern on the base layer and covering same with the carrier layer, removing the base layer and mounting the circuit pattern and carrier layer on a substrate.

8 Claims, 9 Drawing Figures

METHOD AND DEVICE FOR FABRICATING PRINTED WIRING OR THE LIKE

BACKGROUND OF THE INVENTION

1. Field of the Invention

This invention relates to a method and device for fabricating printed wiring, integrated circuits (referred to as IC's hereinafter), or the like by utilizing well known printing techniques.

2. Description of the Prior Art

In the past, ordinarily, printed wiring, or IC's or thick film circuits have been made by screen-printing or by perforated plate printing, on a substrate, the passive circuit elements, such as the wiring portions and resistors.

However, perforated plate printing is undesireable in that a fine pattern can not be printed with a high degree of accuracy and, in the case of screen printing, it is difficult to control the thickness.

In screen printing, a silk screen or a stainless steel screen is employed. A resistive paste or a conductive paste is printed, and dried and baked at a high temperature. Ordinarily, such a printed wiring substrate, IC or thick film circuit substrate is composed of a ceramic substrate of high rigidity such as alumina or beryllia (beryllium oxide). For screen printing on these substrates with a prescribed thickness and high accuracy, it is required that the face of the substrate on which the printing is done be flat and smooth without any warp whatsoever. However, since it is difficult, as a matter of fact, to obtain a ceramic substrate having such a flat and smooth face, it is very difficult to control the thickness of the film of the printed pattern, and high speed printing is difficult to achieve. Besides, even if a ceramic substrate having such flat and smooth face could be obtained by any means, mass-production will be hampered. Further, the above-mentioned disadvantage (i.e. lack of a smooth and flat surface) will become more disadvantageous as the printed area of the substrate becomes larger. Moreover, when a printed pattern constituting a progressive wiring and/or a passive circuit is formed on the substrate, in multi-layers having insulating layers therebetween, the accuracy of the mutual position-fitting and the preciseness of dimensions are reduced.

The main object of this invention is to provide a method and device for fabricating printed wiring, IC's or the like which eliminates the above described disadvantages of the prior art.

SUMMARY OF THE INVENTION

The device of the present invention comprises a removable base layer, a conductive pattern or circuit element pattern printed on the base layer and a carrier layer applied over the pattern. Preferably an adhesive layer is applied over the base layer directly or by way of a thin paper, and the pattern is printed thereon. The carrier layer maintains the pattern in a fixed positional relationship after removal of the base layer.

The method of fabricating printed wiring, IC's, or the like, according to the present invention comprises the steps of forming a base layer and printing a circuit pattern on the base layer. The circuit pattern and at least a portion of the base layer are then covered with a carrier layer which supports the printed circuit pattern and maintains the printed circuit pattern in a fixed positional relationship after removal of the base layer. After the base layer is removed, the printed circuit pattern and the carrier layer are applied to a substrate or the like, the exposed surface of the printed pattern facing the substrate.

DESCRIPTION OF THE PREFERRED EMBODIMENTS

Throughout this specification the reference letter T generally designates a transfer device according to the present invention.

Figure 1:
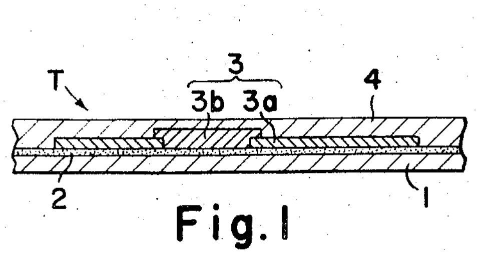
FIG. 1 is an enlarged cross section showing an example of the transfer device of this invention.

As illustrated in FIG. 1, a transfer device T of this invention comprises a base layer 1 formed of paper or the like, a printed circuit pattern 3 and a carrier layer 4 formed thereupon. The printed circuit pattern 3 may comprise a conductive pattern such as wiring and/or passive circuit elements such as resistors and capacitors printed into the desired pattern. Preferably, an adhesive layer 2 is formed on the base layer and the printed circuit pattern 3 is printed thereon.

Base layer 1 is preferably made of strong and hygroscopic paper. The adhesive layer 2 is preferably a water-soluble adhesive composed mainly of such soluble adhesive as polyvinyl alcohol and dextrin; a pressure-sensitive adhesive could also be used.

The printed pattern 3, particularly the portion where a conductive pattern of wiring or electrodes are desired can be made by screen printing, for instance, by using a conductive paste formed by mixing glass flit and conductive powder such as sliver or palladium in an organic binder which can be burnt off in the later baking treatment. As to the portion where a resistive pattern is desired, printing can be done with a paste-like resistive paint wherein glass flit, the above-mentioned conductive powder, silver oxide and palladium oxide are mixed in an organic binder as described above. When a capacitor is desired, a dielectric paint may be printed. Such printing can be done by consecutively applying each layer of dielectric paint. The drawing illustrates a case where, after the conductive pattern **3*a* is printed, the resistive pattern 3*b*** is printed on the prescribed position.

The pattern 3, (**3*a*, 3*b*) is printed on the base layer 1. This enables the pattern to be fabricated with precision and at a high speed by utilizing ordinary printing techniques. Base layer 1** is made of a thin and flexible material, such as paper. Thus, if printing is done by putting the base layer on the flat plane of a base member of the printing apparatus, the printed face can be made flat and the printing can be done such that the screen of the printer and each portion of the base layer are uniformly and closely fit with respect to each other. Hence, the printing can be done with ease, with high accuracy and at a high speed.

The carrier layer 4 is provided to accurately support the printed pattern 3 when the base layer 1 is removed or peeled off as described hereinbelow. Carrier layer 4 also maintains the printed circuit pattern in a predetermined fixed positional relationship after removal of the base layer 1. This is so that the arrangement of the printed circuit is not shifted or altered after the base layer 1 is removed, thereby insuring the desired accuracy when producing printed wiring patterns, IC's or the like. The carrier layer is preferably composed of an organic paint film which burns out in the baking heating treatment at about 500°c. Carrier layer 4 can be formed by spraying a solution of an acrylic resin composed of metacrylic ester 50 percent (by weight) and a high boiling point thinner 50 percent (by weight).

Figure 2A:
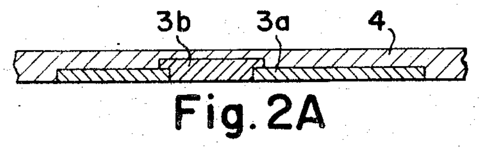
FIGS. 2A, 2B and 2C show an example of the method of making printed wiring or integrated circuits using the transfer device of this invention.
Figure 2B:
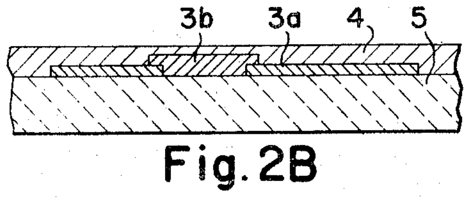
Figure 2C:
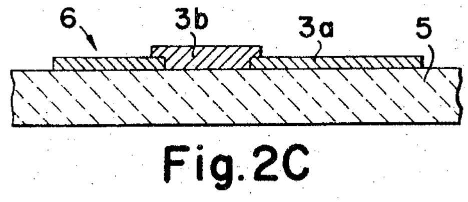

FIG. 2 illustrates forming printed wiring, IC, thick film circuits or the like by using the transfer T of the present invention. When a water soluble adhesive is used as the adhesive layer 2, the base layer 1, such as paper, which has been used as the printing medium is peeled off by wetting and dissolving the whole of the transfer device T or, at least, the base layer 1 portion. When a pressure-sensitive adhesive is used as the adhesive layer 2, the base layer 1 is forcefully and mechanically peeled off (see FIG. 2A). The carrier layer 4, carrying the pattern 3 from which the base layer 1 has been peeled off, is mounted in the prescribed position on a ceramic substrate 5 composed, for example, of alumina or beryllia with the pattern 3 side positioned on the side towards the substrate 5 (see FIG. 2B). Under the necessary pressure, the pattern 3 is baked as it is closely attached on the substrate 5. The baking can be done by heating in the furnace at 500° – 800°C for 60 – 150 min. Thus, the carrier layer 4 burns out and, as illustrated in FIG. 2C, the printed wiring, IC or thick film circuit 6 is obtained on the substrate 5. When the carrier layer 4 is composed of the aforesaid material, it is transparent, and the positioning of the pattern 3 on the substrate 5 can be done by viewing the pattern 3 through the carrier layer 4 even if said pattern 3 is located inside the carrier layer 4. While in the aforesaid example, the pattern 3 is formed in a single layer, this invention will prove more advantageous when the pattern 3 is formed in multi-layers as described hereinbelow.

Figure 3:
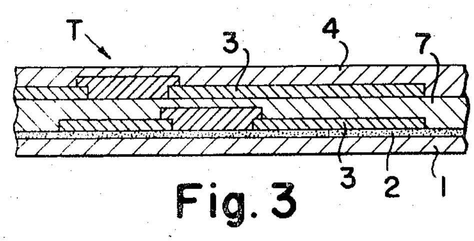
FIGS. 3 and 4 are enlarged cross sections showing different examples of the transfer device of this invention.

Referring to FIG. 3, after forming the base layer 1, adhesive layer 2 and the first pattern which is to become the printed pattern of the lower layer, as described above with reference to FIG. 2, a further adhesive layer 7, such as glass, is coated in the desired pattern by the same printing methods at least on the portion of the lower pattern layer 3 which shall be insulated from the printed patterns to be subsequently formed thereon. Then, the second pattern 3 is printed by the same printing methods as for the first pattern 3, and the carrier layer 4 is formed thereon. In this case, the upper layer pattern 3 is rendered uneven due to the existence of the lower layer pattern 3. But there will be no serious problem. While FIG. 3 shows a case where the printed pattern is formed in double layers, it is obvious that it is possible to form it in three or more multilayers.

It is also possible that, without forming multilayer patterns, two or more kinds of transfer devices T having different printed patterns 3 may be made, and attached overlappingly on one substrate. They may be simultaneously baked to eventually form a multi-layer substrate. In the aforesaid examples, the pattern 3 is preferably printed on an adhesive layer 2 which is on the base layer 1.

Figure 4:
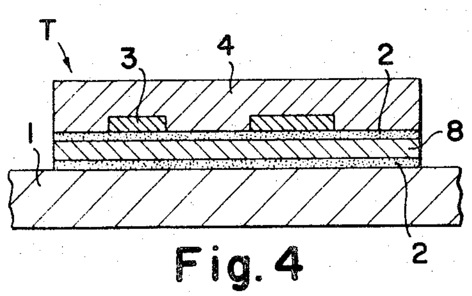

As illustrated in FIG. 4, a thin paper 8 (which is generally called "rice paper" or "cigarette paper") is attached on the base layer 1 by way of adhesive layer 2 and, on said thin layer 8, the printed pattern 3 and carrier layer 4 are consecutively formed in the same manner as described above. Preferably, a second adhesive layer 2 is formed on the upper surface of paper 8 prior to printing. In order to form a printed wiring substrate using this type of transfer device T, the base layer 1 is peeled off as in the above described embodiments. The carrier layer 4 on the opposite side of the thin paper 8 is closely attached on the main body of a substrate 5, and then the baking treatment is carried out. In this case, expansion or contraction due to moisture is less than in the case of a simple construction where only the single base layer 1 is used and, hence, pattern printing can be done with higher accuracy and better resolution. In this embodiment, the overall "base later" comprises layers 1 and 8 with adhesive layer 2 interposed therebetween.

Figure 5A:
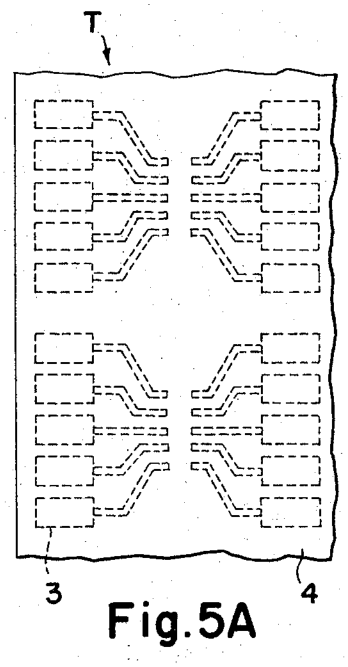
FIGS. 5A and 5B are an enlarged plan view and an enlarged cross section thereof, respectively, showing a process for fabricating an integrated circuit using the transfer device of this invention.
Figure 5B:
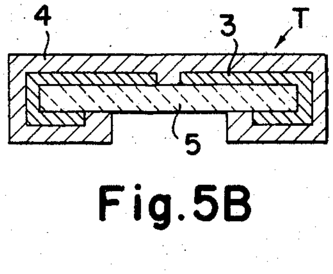

In the embodiment of FIG. 2, the printed pattern 3 is attached on only one face of the substrate 5. It is possible to form patterns on the both faces of substrate 5 by using the transfer device of this invention. In this case, as illustrated in FIGS. 5A and 5B, the printed pattern which is to be formed on both faces of substrate 5 is formed on one transfer device, and the transfer device is wrapped around substrate 5 to envelope the substrate 5, after base layer 1 has been peeled off. Then baking is carried out.

In accordance with the above method, the patterns 3 formed on each face of substrate 5 are connected. Hence, mass-production can be more easily achieved because it will be no longer necessary to open a through-hole in the substrate and electrically connect the patterns on the both faces of the substrate by metalplating the interiors of said through-hole.

Figure 6:
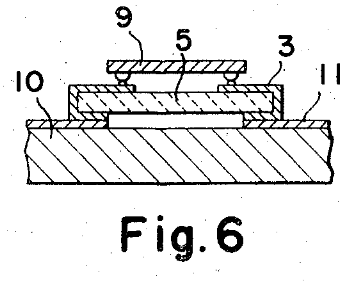
FIG. 6 is an enlarged cross section showing an example of an integrated circuit obtained by using the transfer device of this invention.

After burning out the carrier layer 4 by the baking treatment and baking the printed pattern 3 on the substrate 5, it will be also possible, as illustrated in FIG. 6, to electrically or mechanically mount, by facedown bonding, the parts 9 as a single body semiconductor chip or semiconductor IC chip on the wiring portion corresponding to pattern 3 on either face of substrate 5. The wiring portion of the other face of substrate 5 is fixed by soldering, or the like, on the wiring portion 11 of the prescribed portion on header 10.

When a printed pattern is formed by using the transfer device of this invention, many important advantages are achieved, the most important being listed below.

I. Handling is easy, and the manufacturing process is simplified.

II. Printed patterns of uniform thickness and uniform density are obtained. (Hence, in the resistive pattern, deviations in resistivities can be reduced.)

III. Metallic and non-metallic materials can be handled simultaneously (resistors, conductive wiring portions, electrodes and glass patterns can be obtained simultaneously).

IV. As illustrated in FIGS. 5 and 6, printing on the sides of a substrate 5 as well as on a curved face is easy. Both-face printed substrates are easily fabricated by means of a single transfer device.

V. Printing is done always on the base layer or on a thin paper. Hence, the degree of smoothness of the ultimate substrate surface does not matter.

VI. Multi-layer pattern printing and large area (plurality IC) pattern printing are possible.

Further, it is obvious that the transfer device of this invention can be given a variety of constructions to be useful in fabricating various circuits, not being limited to the aforesaid specific examples.

I claim:

1. Transfer device for use in fabricating printed wiring, integrated circuits or the like comprising:

a removable base layer formed of thin, flexible, paper sheet-like material, said base layer including at least first and second superposed layers of said sheet-like material adhered to each other;

an adhesive layer on said paper sheet-like base layer for receiving a printed circuit pattern thereon; and a substantially transparent carrier layer for covering said printed circuit pattern, said carrier layer supporting and maintaining said printed circuit pattern in a fixed positional relationship after removal of said paper sheet-like base layer to permit application of said printed circuit pattern on a substrate or the like after removal of said paper sheet-like base layer.

2. Transfer device according to claim 1 wherein said sheet-like material layers are paper sheet layers.

3. Transfer device according to claim 1 wherein said base layer includes a first removable paper sheet layer and comprising a second thinner paper sheet layer adhered thereto, said printed pattern being printed over said second layer.

4. Transfer device according to claim 1 wherein said adhesive layer comprises a water soluble adhesive.

5. Transfer device according to claim 1 wherein said adhesive layer comprises a pressure sensitive adhesive.

6. Transfer device according to claim 1 wherein said carrier layer and printed circuit pattern are flexible to enable said carrier layer and printed circuit pattern to be wrapped around at least an edge of said substrate.

7. Transfer device according to claim 1 wherein said carrier layer is removable.

8. Transfer device according to claim 7 wherein said carrier layer is formed of a material which burns off during a baking treatment.

* * * * *